US012578987B2

(12) United States Patent
Pekurovsky et al.

(10) Patent No.: US 12,578,987 B2
(45) Date of Patent: Mar. 17, 2026

(54) VIRTUAL HARDWARE COMPONENTS

(71) Applicant: Arista Networks, Inc., Santa Clara, CA (US)

(72) Inventors: Alon Pekurovsky, Sacramento, CA (US); Adam G Wiggins, Sydney (AU); Deepak Sebastian, San Francisco, CA (US); Nicholas Joukhdar, Sydney (AU); Callum S. Hunter, Sydney (AU)

(73) Assignee: ARISTA NETWORKS, INC., Santa Clara, CA (US)

( * ) Notice: Subject to any disclaimer, the term of this patent is extended or adjusted under 35 U.S.C. 154(b) by 436 days.

(21) Appl. No.: 18/311,356

(22) Filed: May 3, 2023

(65) Prior Publication Data

US 2024/0370284 A1 Nov. 7, 2024

(51) Int. Cl.
*G06F 9/455* (2018.01)

(52) U.S. Cl.
CPC .................... *G06F 9/45558* (2013.01); *G06F 2009/45579* (2013.01); *G06F 2009/45595* (2013.01)

(58) Field of Classification Search
CPC ....... G06F 9/45558; G06F 2009/45579; G06F 2009/45595
See application file for complete search history.

(56) References Cited

U.S. PATENT DOCUMENTS

| | | | |
|---|---|---|---|
| 10,469,317 B1 * | 11/2019 | Jiang | H04L 41/082 |
| 11,194,609 B1 * | 12/2021 | Melkild | G06F 8/60 |
| 2015/0082308 A1 * | 3/2015 | Kiess | G06F 9/5077 718/1 |
| 2018/0062938 A1 * | 3/2018 | Garrison | H04L 41/40 |
| 2018/0349164 A1 * | 12/2018 | Asayag | G06F 9/45558 |
| 2018/0357090 A1 * | 12/2018 | Butcher | G06F 9/45558 |
| 2019/0034219 A1 * | 1/2019 | Xu | G06F 9/5077 |
| 2019/0109756 A1 * | 4/2019 | Abu Lebdeh | H04L 41/0286 |
| 2019/0230049 A1 * | 7/2019 | Clark | H01L 25/18 |
| 2019/0334781 A1 * | 10/2019 | Caldwell | H04L 41/122 |
| 2021/0132976 A1 * | 5/2021 | Chandrappa | H04L 12/4625 |
| 2021/0357245 A1 * | 11/2021 | Cherivirala | G06N 5/04 |
| 2022/0345356 A1 * | 10/2022 | Triplet | H04L 41/0654 |
| 2024/0073094 A1 * | 2/2024 | de Oliveira | H04L 67/34 |
| 2024/0220293 A1 * | 7/2024 | Wang | H04L 67/289 |
| 2024/0348504 A1 * | 10/2024 | Balmakhtar | H04L 41/40 |

* cited by examiner

*Primary Examiner* — Dong U Kim

(74) *Attorney, Agent, or Firm* — Fountainhead Law Group, PC

(57) ABSTRACT

A virtual hardware component (VHC) can be instantiated by loading an image that implements the VHC into a programmable device such as a field programmable gate array (FPGA) and installing a corresponding inventory list of parameters according to which the VHC operates. One or more managing agents are automatically invoked in response to the instantiated VHC to manage the VHC. The VHC is provisioned in response to instantiation of the VHC.

21 Claims, 7 Drawing Sheets

VIRTUAL HARDWARE COMPONENTS

BACKGROUND

The present disclosure relates to providing functionality in a network device. Such functionality can be instantiated by programming one or more programmable devices (e.g., a field programmable gate arrays, FPGAs) on the network device. Conventionally, when functionality is developed for an application on a network device, a corresponding startup driver is written to support that function. When an image is loaded in an FPGA, the resulting instantiated function(s) need to operate with corresponding software (agents) running on the network device. The startup driver makes the connection between the instantiated function(s) and the corresponding software when the FPGA image is loaded. FPGA images that provide functionality for different applications require corresponding startup drivers. Writing these startup drivers creates overhead in the development and support of new applications by device vendors. In addition, startup drivers may require access to low level proprietary data in the network device, which can impede (and in some cases can prevent) the development of applications by third party developers.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
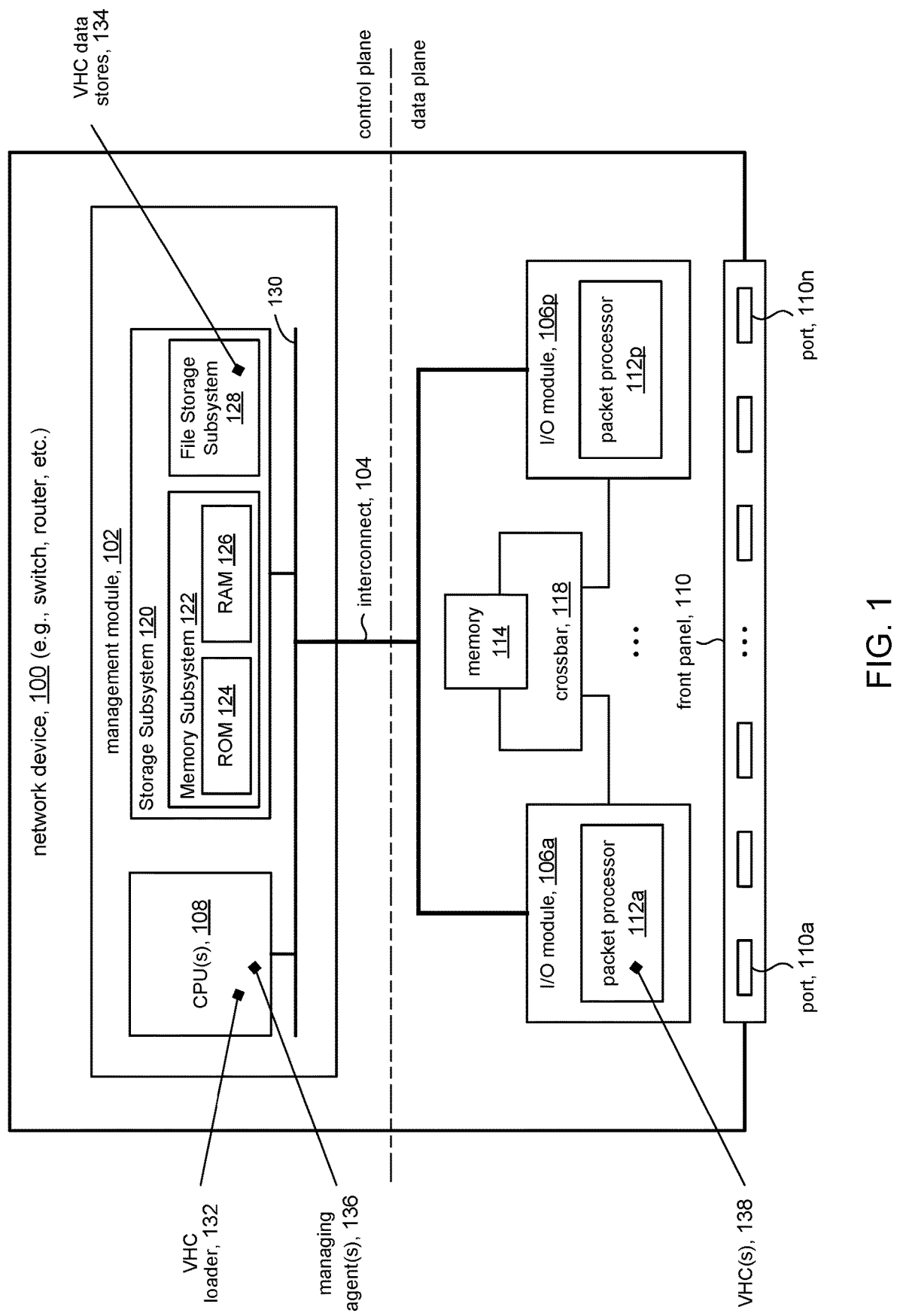
FIG. 1 shows a network device adapted in accordance with the present disclosure.

The present disclosure is directed to virtual hardware components (VHCs) in a network device. A VHC refers to a function or functionality that can be implemented on an FPGA in the network device. For discussion purposes, the description will refer to FPGAs, but one of ordinary skill will appreciate that, in general, VHCs can be implemented on any suitable programmable device or chipset.

The image (bitfile) for an FPGA can define one or more VHCs, where each VHC provides a function (e.g., switch, packet multiplexing, packet timestamping, etc.). In accordance with the present disclosure, each VHC that is defined on an FPGA can be associated with an inventory list. The inventory list identifies parameters of the corresponding VHC, including elements used by the VHC, properties of the VHC, and so on. For instance, a switch application is an example of a VHC. The inventory list for a switch VHC can include a list of ports that the switch VHC would use for traffic ingress and egress, the protocols supported by the switch VHC, and so on. For a given FPGA image, there can be a corresponding inventory list for each VHC implemented on the FPGA.

In accordance with the present disclosure, when an image is programmed onto an FPGA, inventory lists corresponding to the one or more VHCs implemented in the image are loaded/processed as well. More specifically, when the network device loads an image for an FPGA to instantiate the VHC(s), the corresponding inventory list(s) are processed (e.g., executed) to install parameters of the instantiated VHC(s) in the network device. Further in accordance with the present disclosure, VHC listener agents ("listeners") running on the network device can react to the installation of inventory lists for their respective VHCs. When a VHC listener detects the installation of an inventory list for its respective VHC, the listener can trigger one or more corresponding managing agents running on the network device to manage or otherwise operate with the instantiated VHC.

An aspect of the present disclosure is directed to processing that can be performed subsequent to loading an image in an FPGA to instantiate one or more VHCs. More specifically, one or more managing agents associated with a VHC can be triggered in response to a VHC being instantiated. "Triggering" a managing agent can include instantiating the agent to run on the network device, or signaling an already-running agent to begin operating with the VHC.

Another aspect of the present disclosure is automatic provisioning of a VHC in response to the VHC being instantiated. A managing agent associated with a VHC can provision or otherwise configure its respective VHC in order to operate with the network device in response to instantiation of the VHC. Provisioning can include configuring other components in the network device to work with the VHC. Conversely, when a VHC is removed from the system or otherwise deactivated, a managing agent can perform a software teardown.

Another aspect of the present disclosure is directed to remote management of VHCs. One or more managing agents associated with a VHC can remotely manage the VHC over a network at a location separate from the network device. The managing agent can be running on a computer system separate from the network device over a suitable communication network. A VHC that is implemented on a given FPGA can be remotely managed by a respective managing agent. The VHC-to-agent communications can happen over different communication media for different VHCs. For example, VHC1 running on an FPGA may communicate with its managing agent over Ethernet, while VHC2 concurrently running on the same FPGA may communicate with its managing agent over a different communication channel such as I²C (Inter-Integrated Circuit), PCIe (Peripheral Component Interconnect Express), and so on.

The present disclosure is presented in the context of network communications and network devices. It will be appreciated, however, that the present disclosure, more generally, has applicability in computing devices other than network devices.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a schematic representation of a network device 100 (e.g., a router, switch, firewall, and the like) that can be adapted in accordance with the present disclosure. In some embodiments, for example, network device 100 can include a management module 102, one or more I/O modules 106a-106p, and a front panel 110 of I/O ports (physical interfaces, I/Fs) 110a-110n. Management module 102 can constitute the control plane (also referred to as a control layer or simply the CPU) of network device 100 and can include one or more management CPUs 108 for managing and controlling operation of network device 100 in accordance with the present disclosure. Each management CPU 108 can be a general-purpose processor, such as an Intel®/ AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista EOS® operating system, which is a fully programmable and highly modular, Linux-based network operating system, developed and sold/licensed by Arista Networks, Inc. of Santa Clara, California. Other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106a-106p can be collectively referred to as the data plane of network device 100 (also referred to as data layer, forwarding plane, etc.). Interconnect 104 represents interconnections between modules in the control plane and modules in the data plane. Interconnect 104 can be a PCIe bus or any other suitable bus architecture; e.g., SMBus (System Management Bus), I²C, etc. I/O modules 106a-106p can include respective packet processing hardware comprising packet processors 112a-

112p and access to memory hardware 114, to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an ASIC (application specific integrated circuit), FPGA (field programmable gate array), digital processing unit, and the like. Memory hardware 114 can include lookup hardware, for example, content-addressable memory such as TCAMs (ternary CAMs) and auxiliary memory such as SRAMs (static RAMs). I/O modules 106a-106p can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

In accordance with the present disclosure, the management module 102 can include a VHC loader 132, VHC data stores 134, and one or more managing agents 136. As noted above, a VHC refers to functionality that can be implemented on an FPGA (or other programmable device or chipset). An example is functionality for aggregating FPGA statistics. A VHC that provides such a function can transmit these statistics via UDP (User Datagram Protocol) packets at a predefined interval. Other examples include a packet multiplexer, packet time stamper, TAP (test access point) device, packet switching, and the like.

VHCs 138 can be instantiated on one or more I/O modules (e.g., 106a), and in particular the programmable device(s) on the I/O module, to provide functionality for the network device. For discussion purposes, the present disclosure will refer to the functionality being implemented on FPGAs with the understanding that, in general, the functionality can be implemented on any suitable programmable device or chipset in the network device such as SoCs (system on chips), DPUs (digital processing units), GPUs (graphics processing units), CPUs, etc.

It will be appreciated by persons of ordinary skill in the art that some aspects of the present disclosure may be performed in the control plane while other aspects of the present disclosure may be performed in the data plane. Persons of ordinary skill will understand that in some instances, the present disclosure may be performed wholly within the control plane or wholly within the data plane.

Figure 2:
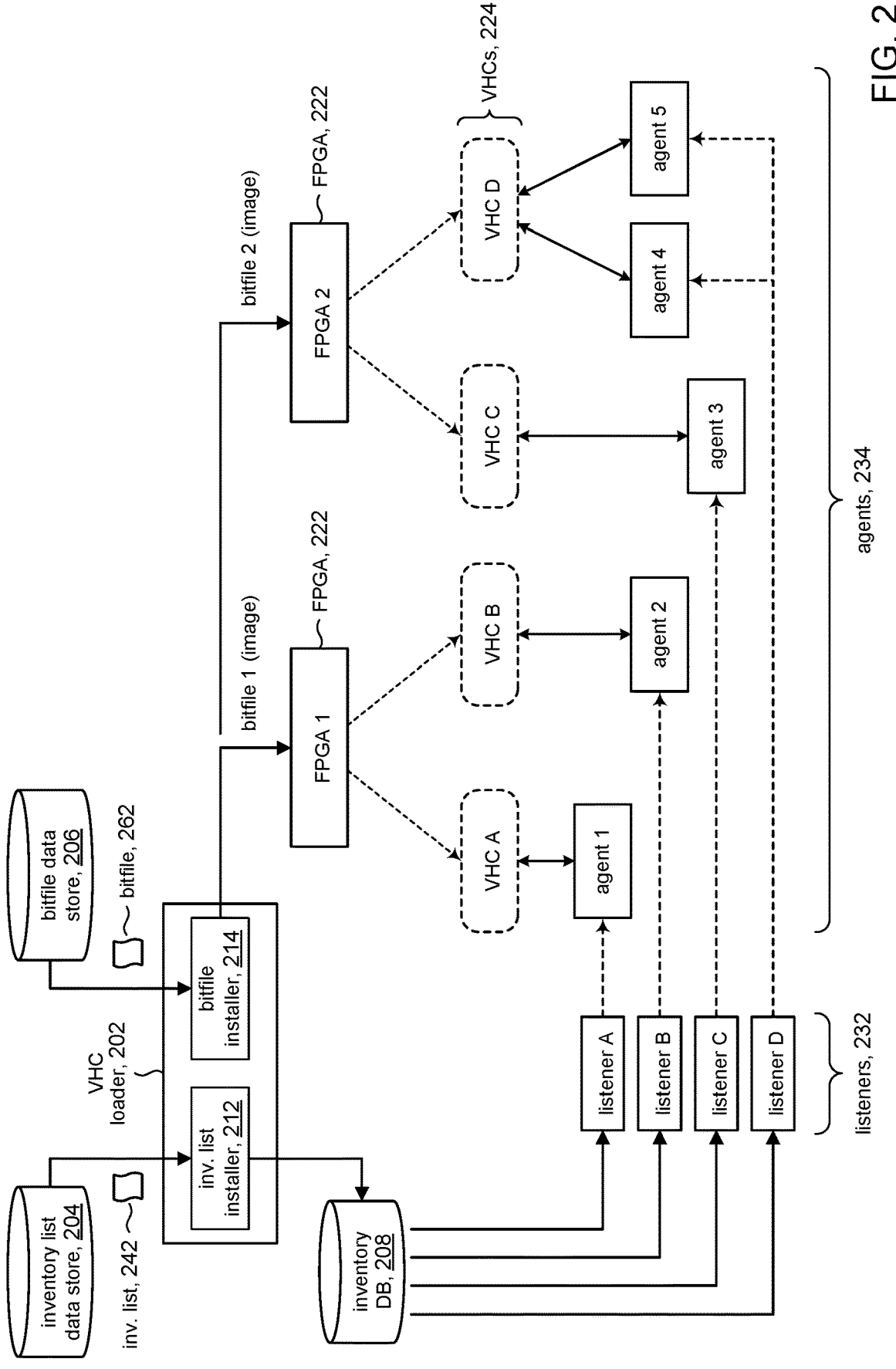
FIG. 2 shows details of instantiating VHCs (virtual hardware components) in accordance with the present disclosure.

FIG. 2 shows an example of infrastructure to support VHCs in accordance with the present disclosure. In some embodiments, for example, the infrastructure can include VHC loader 202. The VHC loader can manage the loading (instantiation) of VHCs 224 in the FPGAs 222 of a network device. The VHC loader can include an inventory list installer 212 and a bitfile installer 214.

The inventory list installer 212 can install an inventory list 242 in an inventory database (DB) 208 for each VHC 224 that is instantiated. In some embodiments, the inventory list can be obtained from an inventory list data store 204 that stores inventory lists for other VHCs. In accordance with the present disclosure, an inventory list for a VHC contains descriptive information about the VHC. For example, the inventory list for a switch VHC can define things like how many ports it has, what protocols it supports, etc. This aspect of the present disclosure is discussed in more detail below.

The bitfile installer 214 can install a bitfile 262 (e.g., a binary file, executable code, etc.) in an FPGA 222 to instantiate one or more VHCs 224 in the FPGA; e.g., the figure shows that bitfile 1 can be loaded into FPGA 1 and bitfile 2 is loaded into FPGA 2. In some embodiments, the bitfile can be obtained from a bitfile data store 206. An FPGA can be programmed to instantiate one or more VHCs; e.g., the figure shows VHC A and VHC B are instantiated on FPGA 1, and VHC C and VHC D are instantiated on FPGA 2. Each VHC in an FPGA can operate independently of another VHC in that FPGA. Stated differently, each VHC in an FPGA can represent a cohesive, standalone unit of functionality within the FPGA relative to other VHC(s) in that FPGA. In FIG. 2, for example, VHC A in FPGA 1 can be a packet multiplexing component to aggregate packet streams into a single packet stream for hand-off to exchanges, microwave links, etc. VHC B in FPGA 1 can be a TAP (test access point) device that operates independently of VHC A for monitoring traffic.

The VHC infrastructure can include VHC listeners 232 and VHC (managing) agents 234. The listeners 232 can monitor the inventory DB 208 for additions of inventory list items from an inventory list 242 to the DB, and vice versa for removal of inventory list items from the inventory DB. The listeners 232 can signal corresponding agents 234 in response to an addition/removal of inventory list items to/from the inventory DB 208.

Each VHC 224 is associated with a managing agent 234. Some VHCs may be associated with one agent; e.g., FIG. 2 shows VHC A is associated with one agent, agent 1. Some VHCs may have multiple agents; e.g., VHC D is associated with two agents, agent 4 and agent 5. Agents interact with their corresponding VHCs, for example, to configure the VHC, to collect data from the VHC, and so on. In some embodiments, agents 234 can be processes that run on the same network device that contains the VHCs; for example, the agents can run in the control plane. As shown and discussed below in connection with FIG. 4A, in some embodiments, managing agents 234 can run on computer systems separate from the network device that contains the VHCs.

Figure 3:
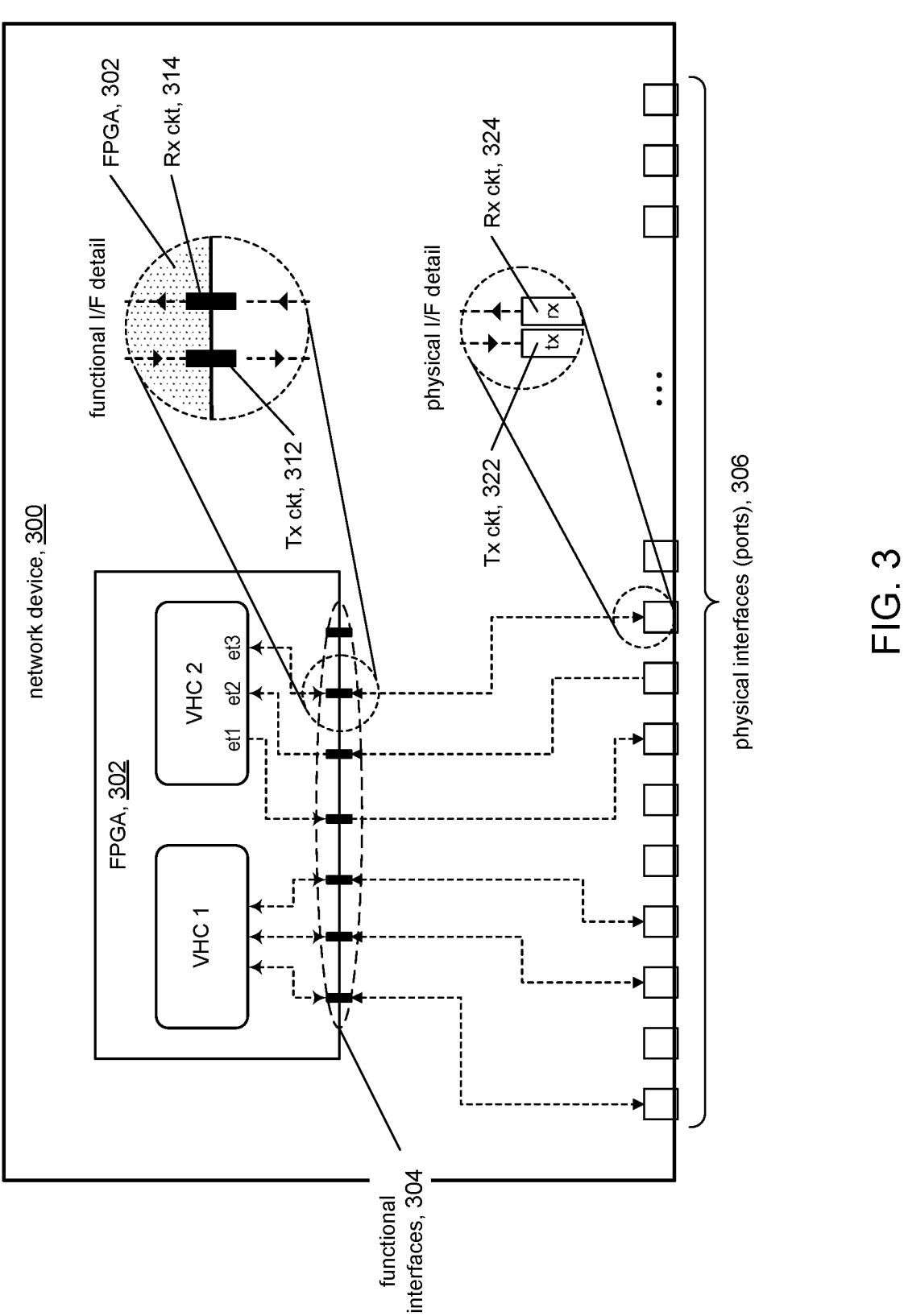
FIG. 3 shows details of a programmable device (e.g., FPGA) in accordance with the present disclosure.

FIG. 3 shows some details of an FPGA 302 in a network device 300. The FPGA example is configured with two VHCs, VHC 1, VHC 2. The FPGA comprises functional interfaces 304 that can be allocated to respective VHCs to receive and/or transmit traffic for the VHCs. In some embodiments, a functional interface can be an Ethernet interface comprising a transmit circuit 312 and/or a receive circuit 314, as illustrated in the functional I/F detail shown in the figure. In some embodiments, a functional I/F can comprise only a transmit circuit (e.g., et1 in VHC 2). In other embodiments, a functional I/F can comprise only a receive circuit (e.g., et2 in VHC 2), and in still other embodiments, a functional I/F can comprise both a transmit and a receive circuit (e.g., et3, VHC 2).

The functional I/Fs 304 of FPGA 302 can be associated with or otherwise functionally mapped to physical I/Fs 306 of network device 300 to enable traffic flow between a VHC on the FPGA and devices connected to the network device. In some embodiments, each physical interface 306 can be an Ethernet interface comprising a transmit circuit 322 and/or a receive circuit 324, as illustrated in the physical I/F detail shown in the figure.

Figure 4A:
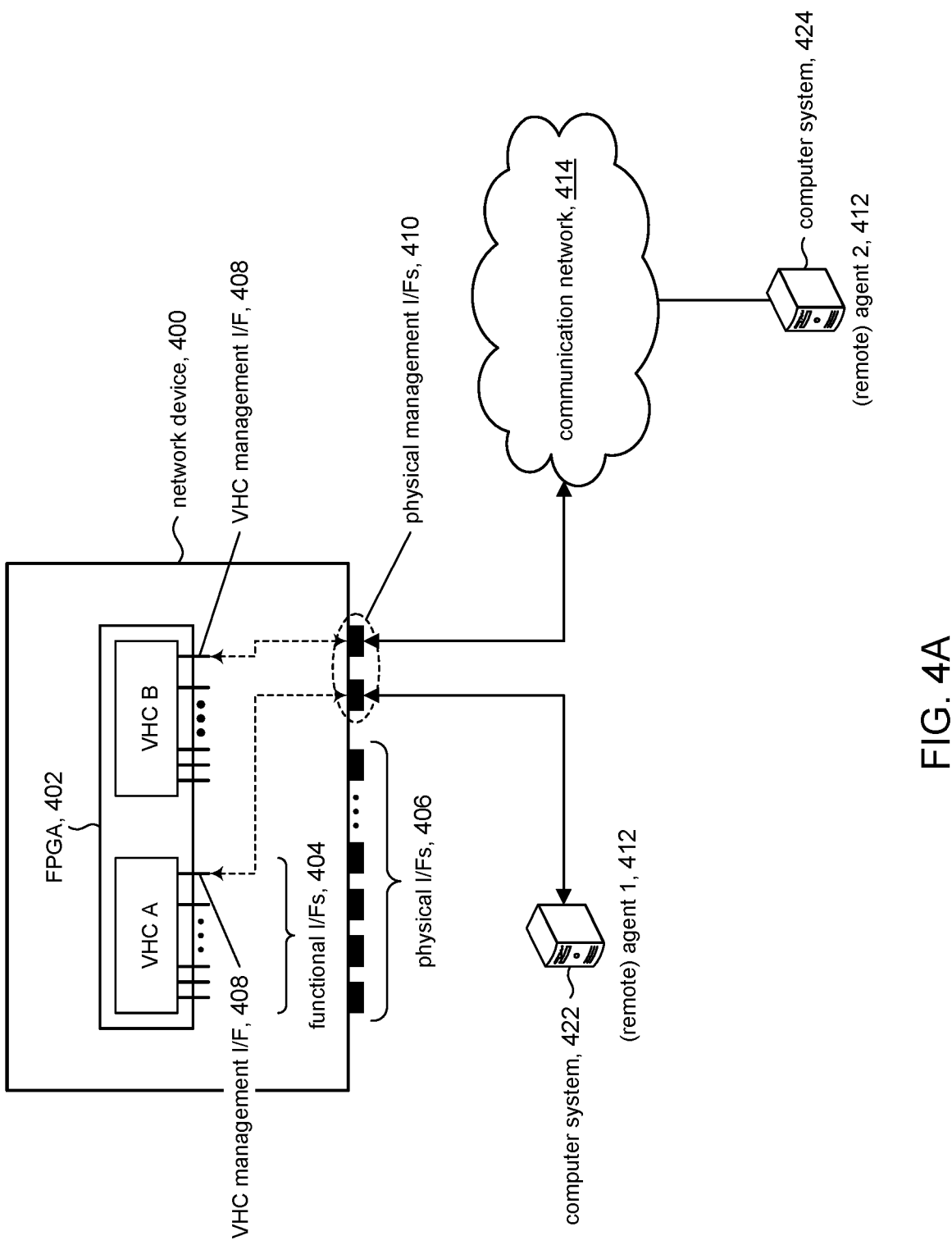
FIGS. 4A and 4B illustrate remote managing agents in accordance with the present disclosure.

FIG. 4A shows a configuration of VHC managing agents in accordance with some embodiments. As noted above in connection with FIG. 2, in some embodiments, agents associated with VHCs can run on the same network device that contains the VHCs. As shown in FIG. 4A, in other embodiments, agents associated with VHCs can run on computer systems separate from the network device that contains the VHCs. FIG. 4A shows a network device 400 comprising an FPGA 402 that is configured with VHC 1 and VHC 2.

The VHCs can be allocated respective functional I/Fs 404 of the FPGA 402 to transmit and receive traffic to and from the FPGA. Likewise, though not shown in FIG. 4A, it will be appreciated that the functional I/Fs 404 can be associated with or otherwise functionally mapped to physical I/Fs 406 of the network device 400, providing a path for traffic between the VHCs and devices connected to the network device.

In some embodiments according to the present disclosure, one or more agent(s) 412 that manage a VHC can run on computer systems separate from the network device over a suitable communication channel such as Ethernet. Agent 1 is an example of a remote agent that manages VHC A and runs on computer system 422 which, as shown in FIG. 4A, is separate from network device 400. VHC A can be associated with a functional I/F 408 (referred to herein as a VHC management I/F) that is mapped to a physical I/F 410 (referred to herein as a physical management I/F) of the network device. The physical management I/F 408 can be connected to computer system 422 (e.g., via Ethernet), allowing the agent 1 to remotely manage VHC A. The connection can be in-band (part of the deployed network) or out-of-band (separate from the deployed network).

In some embodiments, a VHC can be managed by a remote agent over a communication network. For example, FIG. 4A shows agent 2 runs on computer system 424 to manage VHC B via communication network 414.

Figure 4B:
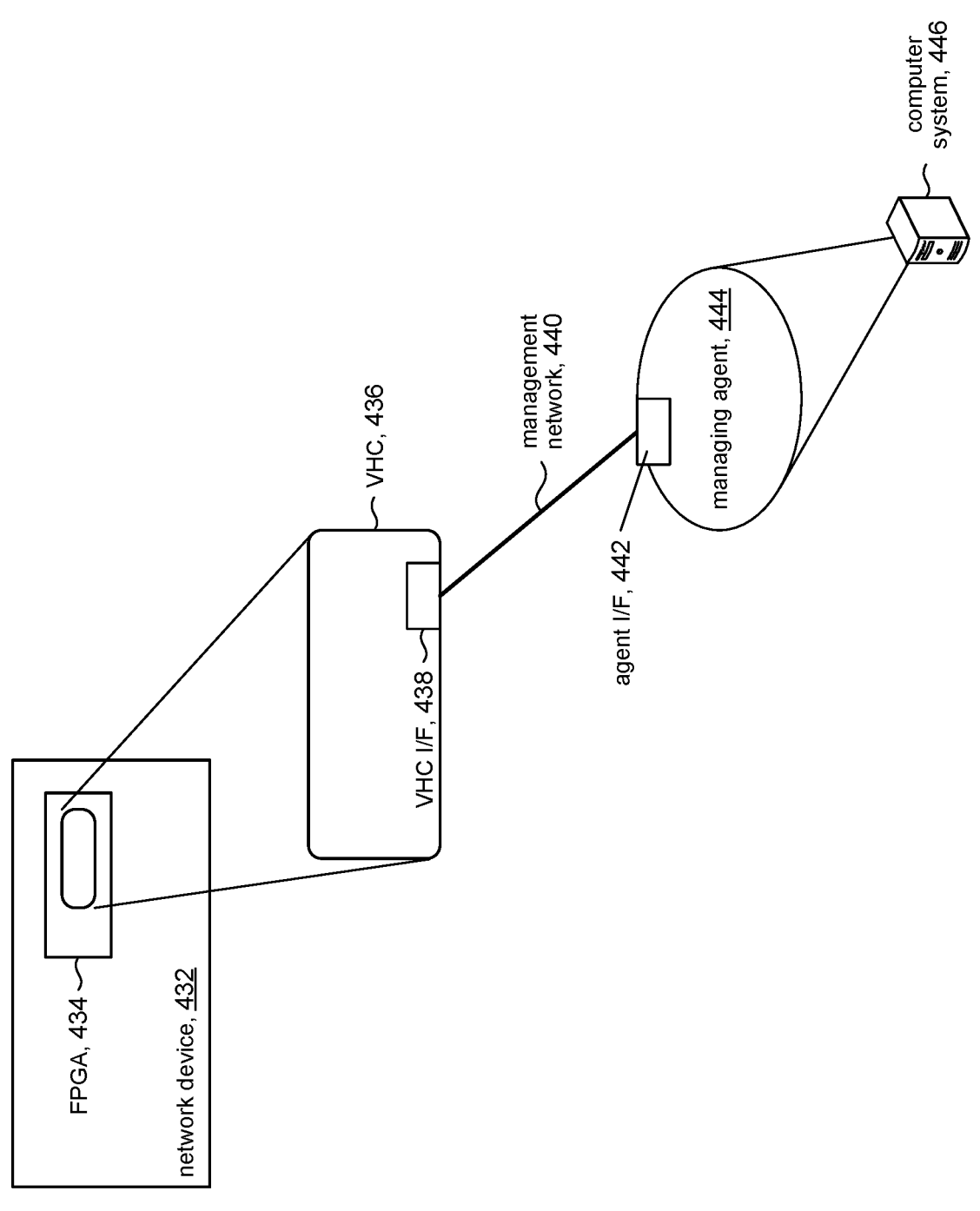

FIG. 4B shows additional details for remote agents in accordance with some embodiments. The figure shows a network device 432 having an FPGA 434. The FPGA instantiates VHC 436. The VHC includes a VHC management interface 438, which in some embodiments, can be an Ethernet interface that is specifically allocated for receiving and sending management traffic to manage the VHC. In accordance with the present disclosure, a VHC can have 1 to N management interfaces, where N is the number of its Ethernet interfaces. A VHC managing agent 444 can run on a computer system 446 that is separate from network device 432. The VHC managing agent 444 can manage VHC 436 across a management Ethernet network 440. The agent 444 can include an agent interface 442 for sending and receiving management traffic.

It will be appreciated that a given VHC can be allocated multiple VHC management I/Fs to connect to multiple agents. One agent can run on the same network device as the VHC, while another agent (remote agent) runs on a computer system separate from the network device. Running agents on remote computer systems can offer:

higher bandwidth than internal communication protocols-
  Agents running in the same network device may connect via protocols such as I²C (Inter-integrated Circuit), PCIe (Peripheral Component Interconnect Express), and the like, which can be slower than Ethernet.
 flexibility-Virtual hardware component (VHC) developers can choose from a wide variety of existing Ethernet protocols to use. Management traffic could then be switched and treated just like any other Ethernet traffic, giving developers the ability to disaggregate where a virtual hardware component and managing agent live. A managing agent could be running on the CPU of the same switch whose virtual hardware component it manages, or it could be running on a dedicated server, for example.

portability—It is easier (from a software point of view) to craft a network configuration to connect a virtual hardware component's management interface to a managing agent than it is to configure a peripheral bus connection.

Figure 5:
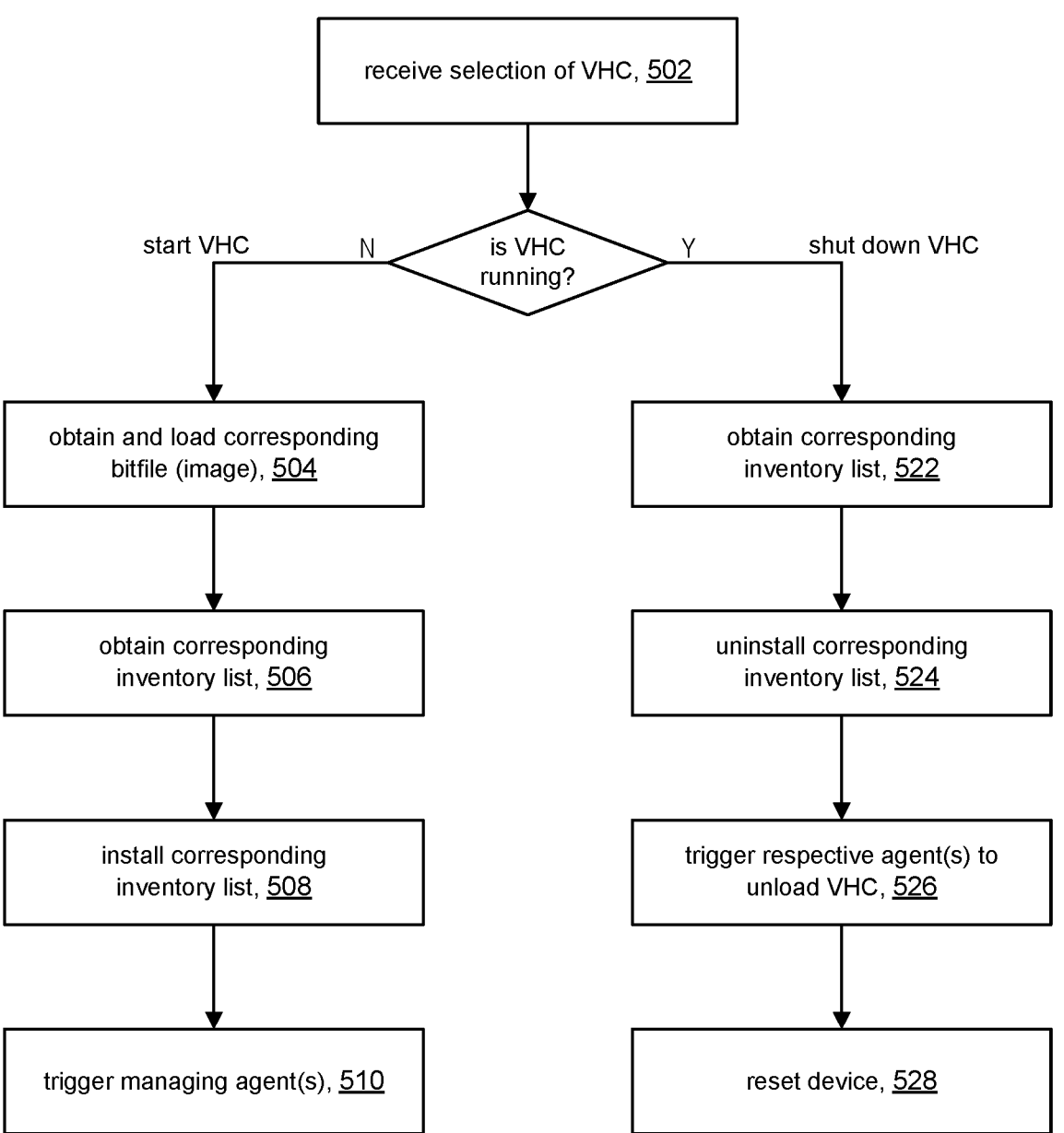
FIG. 5 shows processing in a network device in accordance with the present disclosure.

Referring to FIG. 5, the discussion will now turn to a high-level description of processing in a network device (e.g., 100, FIG. 1) for handling VHCs (e.g., via VHC loader, 202, FIG. 2) in accordance with the present disclosure. In some embodiments, for example, the network device can include one or more digital processing units (circuits), which when operated, can cause the network device to perform processing in accordance with FIG. 5. Depending on implementation, the operations may be performed entirely in the control plane, entirely in the data plane, or divided between the control plane and the data plane. Digital processing units (circuits) in the control plane can include general CPUs that operate by way of executing computer program code stored on a non-volatile computer readable storage medium (e.g., read-only memory); for example, CPU 108 in the control plane (FIG. 1) can be a general CPU. Digital processing units (circuits) in the data plane can include specialized processors such as digital signal processors, field programmable gate arrays, application specific integrated circuits, and the like, that operate by way of executing computer program code or by way of logic circuits being configured for specific operations. For example, each of packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 502, the network device can receive a selection of a VHC to instantiate or shut down the selected VHC. In some embodiments, for example, FPGA bitfiles (images) and related information for VHCs can be stored in the network device. A suitable user interface (UI) can be invoked to list and select a VHC. Processing can continue at operation 504 to instantiate or otherwise start the selected VHC if the VHC is not already running. On the other hand, if the selected VHC is already running, then processing can continue at operation 522 to shutdown or otherwise deactivate the VHC. In some embodiments, for example, the network device can maintain a table that contains the inventory of running VHCs. If the inventory for a particular VHC exists in the table, the corresponding VHC can be deemed to be running.

Instantiate VHC

At operation 504, the network device can begin processing to instantiate or otherwise start the selected VHC. The network device can access storage (e.g., bitfile data store 206) to obtain a bitfile that contains the selected VHC. The obtained bitfile (image) can be loaded into the appropriate FPGA to instantiate the selected VHC.

At operation 506, the network device can access storage (e.g., inventory list data store 204) to obtain the inventory lists corresponding to the instantiated VHC. The inventory list identifies elements and properties of the corresponding VHC, according to which the VHC operates. For instance, a switch application is an example of a VHC. The inventory list for a switch VHC can include a list of ports that the switch will use for traffic ingress and egress, the protocols supported by the switch, and so on. As another example, the inventory list for a VHC that aggregates FPGA statistics may include information such as FPGA register information, UDP packet information for transmitting the collected statistics using UDP, etc. Because the VHCs are independent of each other, each VHC can have its own corresponding inventory list. Moreover, different instances of a VHC can have their own corresponding inventory lists. For example, a 16:1 mux VHC will have an inventory list and a 64:1 mux VHC can have an inventory list different from the inventory list for the 16:1 mux VHC.

At operation 508, the network device can install the inventory list for the selected VHC. In some embodiments, for example, the inventory list can be installed in inventory DB 208. In some embodiments, inventory DB 208 can be part of a runtime operating database of the network device that stores configuration information and state information of the network device; for example, the Arista EOSR operating system uses a runtime DB called Sysdb. In some embodiments, installing an inventory list can include creating database records in the inventory DB corresponding to inventory entries in the inventory list. In some embodiments, the inventory list can be expressed in a procedural language (e.g., C programming language) or an object oriented language (e.g., Python), where the inventory list is executed to effect installation of the inventory list in the inventory DB. In other embodiments, the inventory list can be a data file (e.g., JSON-JavaScript Object Notation, XML-Extensible Markup Language, regular text file, etc.) that can be parsed or otherwise scanned to identify inventory entries that are then installed into the inventory DB.

At operation 510, the network device can trigger one or more managing agents in response to instantiation of the selected VHC. In some embodiments, for example, a listener agent or process (e.g., 232) running on the network device can monitor the inventory DB for the creation of inventory entries for the inventory list corresponding to the instantiated VHC. The listener can trigger one or more respective agents (e.g., 234) to interact with the VHC in response to detecting the installation of the inventory list in the inventory DB. In some embodiments, the listener can trigger the agent by instantiating the managing agent. In other embodiments, the agent can already be running on the network device, and is triggered (activated) by the listener sending a software signal to the agent. As noted above, agents can interact with their respective VHCs including, but not limited to, configuring a VHC during operation of the VHC and reading out VHC state information.

In accordance with some embodiments, the network device can respond to or react to instantiation of the selected VHC by installing the instantiated VHC in the network device. The process of "installing" a VHC can include provisioning or otherwise initially configuring the instantiated VHC to operate with the network device and configuring the network device for operation with the instantiated VHC. When the VHC is instantiated, the VHC needs to be configured in order to operate with the network device, and similarly the network device may need to be configured for operation with the VHC. This is generally referred to as "provisioning" the VHC. In some embodiments, a VHC can be provisioned by an agent that was triggered by the listener. Although not shown in the figures, it will be understood that in other embodiments, the listener can trigger a respective provisioning process to provision the VHC, followed by triggering respective managing agent(s) to interact with the provisioned/active VHC.

Consider, for example, a multiplexer (mux) VHC that is defined to have N mux inputs and a single mux output. The mux functionality includes receiving traffic on its inputs, combining the traffic into a single stream and outputting that stream on its output. The FPGA image that implements the mux may assign the mux inputs and output to specific I/Os (functional interfaces, 304) on the FPGA. However, the functional interfaces are not mapped or otherwise connected to physical ports on the network device. Accordingly, when the mux VHC is initially instantiated on the FPGA, the VHC has no data paths for receiving and transmitting traffic; the data paths can be established by provisioning the VHC. The VHC can be provisioned by assigning the functional interfaces (e.g., 304) of the FPGA to the physical interfaces (e.g., 306) of the network device. As another example, provisioning a switch VHC can include assigning the switch ports to the functional interfaces of the FPGA. In another example, a VHC that aggregates FPGA statistics can include L1 topology information in its inventory list. Provisioning the VHC can include setting up a default L1 path (e.g., by initializing a forwarding table) from a source interface (e.g., a functional interface from which statistics packets are transmitted) to a destination interface.

Provisioning a VHC can also include configuring elements in the network device (e.g., registers, memory, hardware, software processes, etc.) to operate with the VHC. For example, a crossbar switch may need to be configured in order to connect the functional interfaces of the VHC to other interfaces (e.g., front panel interfaces) in the network device. Consider the example of a VHC that streams UDP packets of telemetry data. When this VHC is detected, the network device may be provisioned by routing packets from the VHC (e.g., via a crossbar) to a CPU interface and starting up software to capture and process the UDP packets.

Instantiation of the VHC can be deemed complete.

Shutdown Instantiated VHC

At operation 522, the network device can shutdown or otherwise deactivate the selected VHC. The network device can access storage (e.g., inventory list data store 204) to obtain the inventory lists corresponding to the selected VHC. As noted above, the inventory list identifies elements and properties of the corresponding VHC, according to which the VHC operates.

At operation 524, the network device can delete records in the inventory DB that correspond to inventory entries in the inventory list corresponding to the selected VHC.

At operation 526, the network device (e.g., via a listener agent) can respond to the deletion of records from the inventory DB by triggering one or more agents corresponding to the VHC that is associated with the deleted inventory items. The agents can perform any cleanup that may be needed; e.g., clearing counters, sending notifications, and so on.

At operation 528, the network device (e.g., via an agent) can reset the FPGA on which the selected VHC was instantiated. The shutdown of the VHC can be deemed complete.

Figure 6:
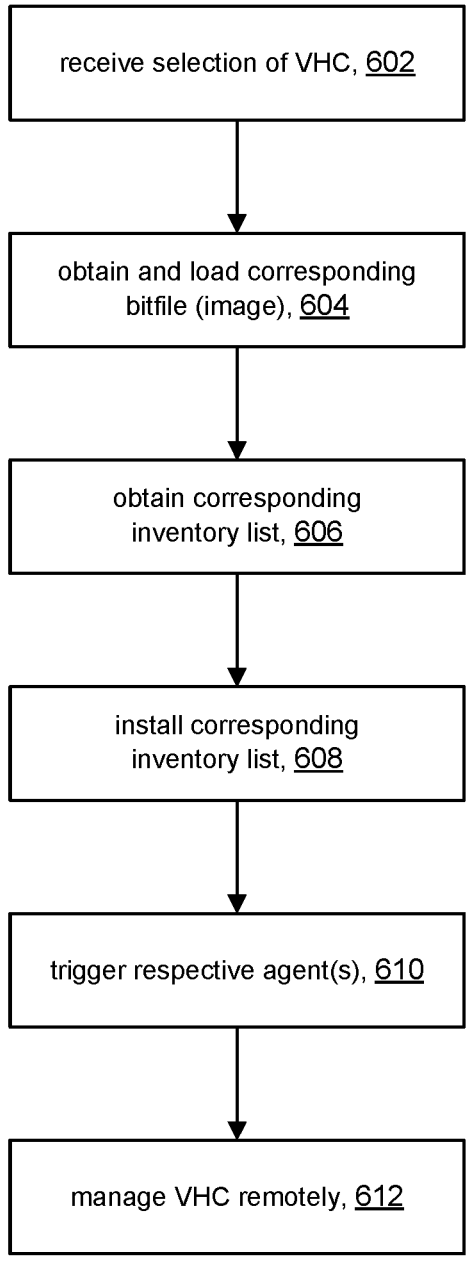
FIG. 6 shows processing in a network device for a remote managing agent in accordance with the present disclosure.

Referring to FIG. 6, the discussion will now turn to a high-level description of processing in a network device (e.g., 100, FIG. 1) for managing VHCs with remote agents in accordance with the present disclosure. In some embodiments, for example, the network device can include one or more digital processing units (circuits), which when operated, can cause the network device to perform processing in accordance with FIG. 6. Depending on implementation, the operations may be performed entirely in the control plane, entirely in the data plane, or divided between the control plane and the data plane. Digital processing units (circuits)

in the control plane can include general CPUs that operate by way of executing computer program code stored on a non-volatile computer readable storage medium (e.g., read-only memory); for example, CPU 108 in the control plane (FIG. 1) can be a general CPU. Digital processing units (circuits) in the data plane can include specialized processors such as digital signal processors, field programmable gate arrays, application specific integrated circuits, and the like, that operate by way of executing computer program code or by way of logic circuits being configured for specific operations. For example, each of packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 602, the network device can receive a selection of a VHC. In some embodiments, for example, FPGA bitfiles (images) and related information for VHCs can be stored in the network device. A suitable user interface (UI) can be invoked to list and select the VHC.

At operation 604, the network device can load the selected VHC. The network device can access storage (e.g., bitfile data store 206) to obtain a bitfile that contains the selected VHC. The obtained bitfile (image) can be loaded into the appropriate FPGA to instantiate or otherwise activate the selected VHC.

At operation 606, the network device can access storage (e.g., inventory list data store 204) to obtain an inventory list corresponding to the instantiated VHC. As noted above, the inventory list identifies elements and properties of the corresponding VHC.

At operation 608, the network device can install the inventory list for the selected VHC. In some embodiments, for example, the inventory list can be installed in inventory DB 208. In some embodiments, inventory DB 208 can be part of an operating database of the network device that stores device state and configuration information.

At operation 610, the network device can invoke one or more managing agents in response to instantiation of the selected VHC. A listener (e.g., 232) running on the network device can monitor the inventory DB for the creation of inventory entries for an inventory list associated with the VHC. In response to the creation of inventory entries of the inventory list, the listener can trigger one or more managing agents (e.g., 234) to manage the VHC.

In accordance with some embodiments, the managing agent can run on a remote computer system separate from the network device, such as shown for example in FIG. 4A by computer systems 422 or 424. In some embodiments, the listener can trigger the remote agent by instantiating the agent on the computer system, for example, by making a remote procedure call. In other embodiments, the remote agent can already be running on the computer system, and is triggered by the listener sending a software signal to the remote agent to activate the remote agent. In some embodiments, the remote agents can provision the VHCs as described above (e.g., at operation 510, FIG. 5).

At operation 612, the network device (via the instantiated VHC) can communicate with the remote agent over a suitable communication channel, e.g., via an Ethernet connection, allowing the remote agent to manage the VHC. The VHC can receive configuration information from the remote agent; e.g., reset a port, bring a port up or down, and so on.

The VHC can be configured by the remote agent to provide operating metrics to the remote agent, and so on.

It is noted that in some embodiments, a remote agent that is already running on a remote computer system can initiate the flow shown in FIG. 6, namely, "telling" the network device to load an FPGA with a bitfile and inventory list.

The instantiation of the VHC can be deemed complete.

Further Examples

Features described above as well as those claimed below may be combined in various ways without departing from the scope hereof. The following examples illustrate some possible, non-limiting combinations:

(A1) A method for installing functionality in a network device, the method comprising: storing a binary image in a first data store of the network device, the first data store comprising a plurality of images, the binary image comprising program code instructions that implement a plurality of virtual hardware components (VHCs) which provide a plurality of corresponding independent functions in the network device; storing an inventory list for each VHC defined in the binary image, the inventory list comprising parameters of the function provided by said each VHC; loading a binary image, selected from the plurality of images, in a programmable device of the network device to instantiate at least one VHC implemented by the selected binary image; and loading an inventory list corresponding to the instantiated VHC into a second data store of the network device, wherein loading the corresponding inventory list into the second data store triggers at least one respective managing agent that runs on the network device to operate with the instantiated VHC.

(A2) The method denoted as (A1), further comprising provisioning the instantiated VHC to operate with the network device in response to detecting loading of the inventory list corresponding to the VHC into the second data store of the network device.

(A3) For the method denoted as any of (A1) through (A2), the second data store is a runtime system database comprising configuration information and state information of the network device.

(A4) The method denoted as any of (A1) through (A3), further comprising running a VHC listener agent to monitor the second data store, wherein when the VHC listener agent detects the loading of an inventory list corresponding to the instantiated VHC, the VHC listener agent triggers execution of a managing agent associated with the instantiated VHC.

(A5) For the method denoted as any of (A1) through (A4), the managing agent operates with the instantiated VHC by configuring the VHC during operation of the VHC and by reading status of the VHC during operation of the VHC.

(A6) The method denoted as any of (A1) through (A5), further comprising deactivating the instantiated VHC including the managing agent resetting the programmable device that instantiates the VHC.

(A7) For the method denoted as any of (A1) through (A6), deactivating the instantiated VHC further includes deleting the parameters of the inventory list corresponding to the instantiated VHC from the second data store, wherein the managing agent, in response to detecting deletion of the parameters of the inventory list, resets the programmable device.

(B1) A network device comprising: one or more computer processors; a memory; at least one programmable device; and a computer-readable storage system comprising instructions for controlling the one or more computer processors to:

configure a programmable device of the network device to instantiate at least one function in the programmable device; access an inventory list corresponding to the function comprising parameters according to which the function operates; load the parameters of the corresponding inventory list in a memory of the network device; and in response to loading the parameters of the corresponding inventory list in the memory of the network device, trigger at least one agent process on the network device to operate with the instantiated function.

(B2) For the network device denoted as (B1), the computer-readable storage system further comprises instructions for controlling the one or more computer processors to provision the instantiated function to operate with the network device in response to detecting loading of the parameters of the inventory list.

(B3) For the network device denoted as any of (B1) through (B2), the function is configured to receive and transmit data via functional interfaces of the programmable device, wherein the provisioning includes assigning functional interfaces of the programmable device to physical interfaces of the network device.

(B4) For the network device denoted as any of (B1) through (B3), the computer-readable storage system further comprises instructions for controlling the one or more computer processors to run a listener process to monitor the memory of the network device, wherein when the listener process detects the loading of the parameters of the inventory list, the listener triggers execution of the agent associated with the instantiated function.

(B5) For the network device denoted as any of (B1) through (B4), the computer-readable storage system further comprises instructions for controlling the one or more computer processors to deactivate the instantiated function including the agent resetting the programmable device on which the function is instantiated.

(C1) A method for activating functionality in a network device, the method comprising: configuring a programmable device of the network device to instantiate at least one function in the programmable device; accessing an inventory list corresponding to the function, the inventory list comprising parameters according to which the function operates; loading the parameters of the corresponding inventory list in a memory of the network device; and in response to instantiating the at least one function in the programmable device, triggering at least one agent process on the network device to operate with the instantiated function.

(C2) The method denoted as (C1), further comprising provisioning the instantiated function to operate with the network device in response to instantiating the at least one function in the programmable device.

(C3) The method denoted as any of (C1) through (C2), further comprising provisioning the instantiated function to operate with the network device in response to detecting loading of the parameters of the inventory list corresponding to the function into the memory of the network device.

(C4) For the method denoted as any of (C1) through (C3), loading the parameters includes loading the parameters in a runtime database on the network device.

(C5) For the method denoted as any of (C1) through (C4), triggering the at least one agent process on the network device to operate with the instantiated function is further in response to loading the parameters of the corresponding inventory list in the memory of the network device.

(C6) The method denoted as any of (C1) through (C5), further comprising running a listener process to monitor the memory of the network device, wherein when the listener detects the loading of the parameters of the inventory list in the memory, the listener triggers execution of the at least one agent.

(C7) The method denoted as any of (C1) through (C6), further comprising deactivating the instantiated function including the agent resetting the programmable device that instantiates the function.

(C8) For the method denoted as any of (C1) through (C7), deactivating the instantiated function further includes deleting the parameters of the inventory list from the memory, wherein the agent, in response to detecting deletion of the parameters of the inventory list, resets the programmable device.

A virtual hardware component (VHC) can be instantiated by loading an image that implements the VHC into a programmable device such as a field programmable gate array (FPGA) and installing a corresponding inventory list of parameters that define operating parameters of the VHC. One or more managing agents are automatically invoked in response to the instantiated VHC to manage the VHC. The managing agents run on computer systems separate from the network device. In some instances, the managing agents communicate with the instantiated VHC over an Ethernet connection. The following examples illustrate some possible, non-limiting combinations:

(D1) A method for managing virtual hardware components (VHCs) in a network device, the method comprising: loading a binary image, selected from among a plurality of binary images, in a programmable device of the network device to instantiate at least one VHC implemented by the selected binary image; for the instantiated VHC, loading a corresponding inventory list into a memory of the network device, wherein the inventory list comprises a plurality of parameters, wherein the instantiated VHC operates according to the parameters; and in response to loading the inventory list corresponding to the instantiated VHC, triggering execution of a remote agent associated with the corresponding instantiated VHC to operate with the instantiated VHC, wherein the remote agent runs on a computer system separate from the network device.

(D2) The method denoted as (D1), further comprising the instantiated VHC communicating with the remote agent over an Ethernet connection.

(D3) The method denoted as any of (D1) through (D2), further comprising the instantiated VHC communicating with the remote agent over an out-of-band network.

(D4) The method denoted as any of (D1) through (D3), further comprising the instantiated VHC receiving configuration information from the remote agent during operation of the VHC.

(D5) The method denoted as any of (D1) through (D4), further comprising the instantiated VHC providing operating metrics to the remote agent during operation of the VHC.

(D6) For the method denoted as any of (D1) through (D5), triggering execution of a remote agent includes instantiating execution of the remote agent to run on the computer system.

(D7) For the method denoted as any of (D1) through (D6), triggering execution of a remote agent includes signaling an already-running remote agent running on the computer system.

(D8) The method denoted as any of (D1) through (D7), further comprising provisioning the instantiated VHC for operation with the network device.

(E1) A network device comprising: one or more computer processors; and a computer-readable storage device comprising instructions for controlling the one or more computer processors to: load a binary image, selected from among a plurality of binary images, in a programmable device of the network device to instantiate at least one VHC implemented by the selected binary image; load an inventory list, corresponding to the instantiated VHC, into a memory of the network device, wherein the inventory list comprises a plurality of parameters, wherein the instantiated VHC operates according to the parameters; and respond to loading of the inventory list corresponding to the instantiated VHC by triggering execution of a remote agent associated with the instantiated VHC to operate with the instantiated VHC, wherein the remote agent runs on a computer system separate from the network device.

(E2) For the network device denoted as (E1), the instantiated VHC communicates with the remote agent over an Ethernet connection.

(E3) For the network device denoted as any of (E1) through (E2), the instantiated VHC communicates with the remote agent over an out-of-band network.

(E4) For the network device denoted as any of (E1) through (E3), the instantiated VHC receives configuration information from the remote agent during operation of the VHC.

(E5) For the network device denoted as any of (E1) through (E4), instantiated VHC provides operating metrics to the remote agent during operation of the VHC.

(E6) For the network device denoted as any of (E1) through (E5), triggering execution of a remote agent includes instantiating execution of the remote agent to run on the computer system.

(E7) For the network device denoted as any of (E1) through (E6), triggering execution of a remote agent includes signaling an already-running remote agent running on the computer system.

(E8) For the network device denoted as any of (E1) through (E7), the computer-readable storage device further comprises instructions for controlling the one or more computer processors to provision the instantiated VHC for operation with the network device.

(F1) A method activating functionality in a network device, the method comprising: configuring a programmable device of the network device to instantiate at least one function in the programmable device; accessing an inventory list corresponding to the function, the inventory list comprising parameters according to which the function operates; loading the parameters of the corresponding inventory list in a memory of the network device; and in response to instantiating the at least one function in the programmable device, triggering at least one agent process to run on a computer system separate from the network device to operate with the instantiated function.

(F2) The method denoted as (F1), further comprising the instantiated function communicating with the remote agent over an Ethernet connection.

(F3) The method denoted as any of (F1) through (F2), further comprising the instantiated function receiving configuration information from the remote agent during operation of the function.

(F4) The method denoted as any of (F1) through (F3), further comprising the instantiated function providing operating metrics to the remote agent during operation of the function.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for installing functionality in a network device that is a switch or a router, the method comprising:
    storing a binary image in a first data store of the network device, the first data store comprising a plurality of binary images, the binary image comprising program code instructions that implement a plurality of virtual hardware components (VHCs), wherein each VHC provides a corresponding independent function in the network device;
    storing an inventory list for each VHC defined in the binary image, the inventory list comprising parameters of the corresponding function provided by said each VHC;
    loading a binary image, selected from the plurality of binary images, in a programmable device of the network device to instantiate at least one VHC implemented by the loaded binary image; and
    loading an inventory list corresponding to the instantiated VHC into a second data store of the network device, wherein loading the corresponding inventory list into the second data store triggers at least one respective managing agent that runs on the network device to operate with the instantiated VHC.

2. The method of claim 1, further comprising provisioning the instantiated VHC to operate with the network device in response to detecting loading of the inventory list corresponding to the instantiated VHC into the second data store of the network device.

3. The method of claim 1, wherein the second data store is a runtime system database comprising configuration information and state information of the network device.

4. The method of claim 1, further comprising running a VHC listener agent to monitor the second data store, wherein when the VHC listener agent detects the loading of an inventory list corresponding to the instantiated VHC, the VHC listener agent triggers execution of the at least one respective managing agent associated with the instantiated VHC.

5. The method of claim 1, wherein the at least one respective managing agent operates with the instantiated VHC by configuring the instantiated VHC during its operation and by reading status of the instantiated VHC during its operation.

6. The method of claim 1, further comprising deactivating the instantiated VHC including the at least one respective managing agent resetting the programmable device that instantiates the VHC.

7. The method of claim 6, wherein deactivating the instantiated VHC further includes deleting the parameters of the inventory list corresponding to the instantiated VHC from the second data store, wherein the at least one respective managing agent, in response to detecting deletion of the parameters of the inventory list, resets the programmable device.

8. A network device that is a switch or a router comprising:
    one or more computer processors;
    a memory;
    at least one programmable device; and a computer-readable storage system comprising instructions for controlling the one or more computer processors to:
        configure a programmable device of the network device to instantiate at least one function in the programmable device;
        access an inventory list corresponding to the at least one function comprising parameters according to which the at least one function operates;
        load the parameters of the corresponding inventory list in a memory of the network device; and
        in response to loading the parameters of the corresponding inventory list in the memory of the network device, trigger at least one managing agent process on the network device to operate with the at least one function.

9. The network device of claim 8, wherein the computer-readable storage system further comprises instructions for controlling the one or more computer processors to provision the at least one function to operate with the network device in response to detecting loading of the parameters of the inventory list.

10. The network device of claim 8, wherein the at least one function is configured to receive and transmit data via functional interfaces of the programmable device, wherein the provisioning includes assigning functional interfaces of the programmable device to physical interfaces of the network device.

11. The network device of claim 8, wherein the computer-readable storage system further comprises instructions for controlling the one or more computer processors to run a listener process to monitor the memory of the network device, wherein when the listener process detects the loading of the parameters of the inventory list, the listener triggers execution of the at least one managing agent associated with the at least one function.

12. The network device of claim 8, wherein the computer-readable storage system further comprises instructions for controlling the one or more computer processors to deactivate the at least one function including the at least one managing agent resetting the programmable device on which the at least one function is instantiated.

13. A method for activating functionality in a network device that is a switch or a router, the method comprising:
    configuring a programmable device of the network device to instantiate at least one function in the programmable device;
    accessing an inventory list corresponding to the at least one function, the inventory list comprising parameters according to which the at least one function operates;
    loading the parameters of the corresponding inventory list in a memory of the network device; and
    in response to instantiating the at least one function in the programmable device, triggering at least one managing agent process on the network device to operate with the at least one function.

14. The method of claim 13, further comprising provisioning the at least one function to operate with the network device in response to instantiating the at least one function in the programmable device.

15. The method of claim 13, further comprising provisioning the at least one function to operate with the network device in response to detecting loading of the parameters of the inventory list corresponding to the at least one function into the memory of the network device.

16. The method of claim 13, wherein loading the parameters includes loading the parameters in a runtime database on the network device.

17. The method of claim 13, wherein triggering the at least one managing agent process on the network device to operate with the at least one function is further in response to loading the parameters of the corresponding inventory list in the memory of the network device.

18. The method of claim 17, further comprising running a listener process to monitor the memory of the network device, wherein when the listener detects the loading of the parameters of the inventory list in the memory, the listener triggers execution of the at least one managing agent.

19. The method of claim 13, further comprising deactivating the at least one function including the at least one managing agent resetting the programmable device that instantiates the at least one function.

20. The method of claim 19, wherein deactivating the at least one function further includes deleting the parameters of the inventory list from the memory, wherein the at least one managing agent, in response to detecting deletion of the parameters of the inventory list, resets the programmable device.

21. The method of claim 19, wherein the at least one managing agent runs on a computer system separate from the network device and the VHC communicates with a remote agent over an Ethernet connection or over an out-of-band network.

* * * * *